United States Patent Office

3,243,335
Patented Mar. 29, 1966

3,243,335
CERAMIC PRODUCT AND PROCESS OF
PRODUCING IT
Samuel P. Faile, 152 Purdy Ave., White Plains, N.Y.
No Drawing. Filed Mar. 13, 1963, Ser. No. 264,752
6 Claims. (Cl. 161—1)

This invention relates to a process for producing an improved ceramic product. In particular, this invention pertains to a special treatment of certain types of glass compositions in order to produce a ceramic product which is improved in strength and utility due to greater surface resistance to flaws, cracking and external forces.

The ceramic industry is continually striving for ceramic products which are strong, durable and highly resistant to external stresses and as such can be utilized in innumerable industrial and commercial capacities. While industry has devised numerable methods of producing ceramic products depending primarily upon the end product which is sought, this invention is concerned with the production of a ceramic product from glass compositions containing nucleating agents. The presence of the nucleating agents in the glass composition permits the devitrification or crystallization of the composition by raising the composition to a requisite temperature by heat. However, prior to this time this nucleating process of glass compositions effected a crystallization throughout the whole composition. In the present invention it is intended that only a particular portion, in particular, the internal portion, of the object composed of the glass composition containing the nucleating agents be devitrified in order to produce a ceramic product of high strength and durability which is comprised internally of a crystalline structure and at and near its surface of a vitrified structure.

It has been known for a considerable period of time that increased tempering of glass products can be achieved by establishing through dielectric or induction heating a temperature gradient in the glass composition whereby the inner or center portions are at a higher temperature than the surface. Since the greater temperature at the interior of the glass composition will produce a lower viscosity at the center of the glass composition than at the surface, it is possible to obtain a final condition throughout the glass of desired stress characteristics whereby the center portions will be under tensile stress vis-a-vis the surface areas which will be under compressional stress. When this final condition is retained in the glass composition upon cooling, an unrelieved stress pattern is set up in the glass composition. This produces a product which has increased resistance to thermal and mechanical shock since the surfaces which are under compressional forces have greater resistance to flaws which in turn lead to cracking initiation and propagation.

Accordingly, it is the primary object of this invention to utilize a known process for tempering glass objects in the production of a ceramic product which has increased resistance to thermal and mechanical shock than could be obtained by the mere tempering of a glass object.

A further object is to establish a permanent strain pattern in a ceramic product whereby the surface areas will be subjected to enlarged compressional stresses so as to increase the strength and durability of the ceramic product.

A still further object of this invention resides in the subjection of a glass composition containing a nucleating agent to dielectric or induction heating so as to produce a composition containing an interior crystalline structure and an exterior vitrified structure.

These together with other objects and advantages which will become subsequently apparent reside in the characteristics of the glass composition from which is formed the ceramic product and the particular manner by which the glass composition is treated as more fully hereinafter described and claimed.

With respect to this invention, it has been found for glass compositions containing various nucleating agents that the temperature at which appreciable crystallization takes place is markedly above the annealing point of the glass composition.

Further, many glass compositions have higher coefficients of thermal expansion in the crystallized state than in the uncrystallized state, and many of these compositions have higher annealing points in the crystallized state than in the uncrystallized state.

Accordingly, a glass composition of these characteristics is subjected to the electric component of high frequency electromagnetic field which causes a temperature gradient to be established within the glass composition due to the high dielectric losses which are set up within the glass composition and at the same time subjecting the surface of the glass composition to cooling treatment. In so subjecting the glass composition containing the nucleating agent to heat treatment by this dielectric process, it is intended that the minimum temperature be maintained at approximaely the annealing temperature of the glass composition. In view of the heating process employed, this would require that the temperature at the surface of the glass composition be at least as high as the annealing temperature with the interior regions at respectively higher temperatures in accordance with the temperature gradient pattern.

The temperature gradient which is established from the center to the surface of the glass composition should be such that the temperature towards the center of the specimen is high enough to produce variable degrees of appreciable crystallization. At the same time the temperature maintained at the regions near the surface of the specimen should be cool enough to prevent crystallization or devitrification. Accordingly, the surface temperature must be kept near the annealing point of the glass composition and not permitted to go appreciably higher in order to maintain the surface or exterior regions of the composition in the vitrified state.

As the regions toward the center of the glass crystallize their viscosity increases resulting in a higher annealing point than in the uncrystallized regions near the surface of the specimen. In other words, this results in a center region wherein the temperature of the annealing point is higher than that for the surface.

Therefore, when the glass specimen possessing the above-described temperature gradient is rapidly cooled, the interior portion with its higher annealing point than would be present in an uncrystallized glass composition will impart greater compressional forces on the surface regions (which are still in the vitrified state) than would be present without crystallization. This is true, because the crystallized interior portions of the new ceramic product with its increased coefficient of thermal expansion will create a more exaggerated tension-compression stress pattern within the interior and exterior regions of the product and due to the higher annealing point will not be as capable of relieving the compressional stress produced in the exterior regions as would be the case for a wholly uncrystallized glass body.

As a result, the centrally devitrified ceramic article will have a thinner region of compression as compared to a wholly vitrified article and will have a surface which is contracted and compressed more than would be expected because the regions of compression would not be so great in volume as to prevent appreciable contraction. Since the failure of glass or ceramic articles generally starts at the surface, and glass is known to be stronger in compression than in tension, a glass or ceramic article with a surface having higher compressional stresses will undoubtedly have greater strength and durability because of greater resistance to external thermal or mechanical forces.

A better understanding of the advantages inherent in the new ceramic product produced in accordance with this invention can be obtained by considering the effect of a similar process on a wholly glass product and then comparing the resultant compressional and tensional stress pattern established within the respective products.

In tempering a normal glass product by first establishing a temperature gradient from the center of the product to its surface and thereafter rapidly cooling, the degree of compressional stress established in the exterior portions of the product is dependent primarily upon the extent to which the desired tension-compression stress pattern can be established and the ability during the rapid cooling step to maintain the stress pattern established by the temperature gradient. Accordingly, if the glass composition being treated has an interior which due to a physical transformation of its character possesses a higher coefficient of thermal expansion thereby producing a more exaggerated tension-compression stress pattern between the interior and exterior portions of the composition and possesses a higher annealing temperature by which the interior region will force the composition to retain the established inherent stress pattern, it is a necessary conculsion that this glass composition upon quick cooling must necessarily have a surface or exterior region which is under greater compressional stress than would be expected for a wholly uncrystallized glass composition. This must be so for a glass composition having a crystallized interior, because such interior portion has expanded to a greater degree vis-a-vis the exterior portion than would be true in a wholly uncrystallized composition and because the annealing temperature of the crystallized interior portion is higher than in an uncrystallized interior portion facilitating retention upon cooling of its expanded state, or tensional stress, vis-a-vis the exterior portion.

In considering a specific embodiment of this invention it has been found that a glass composition containing either zirconium oxide or titanium dioxide as the nucleating agent experiences appreciable crystallization at a temperature approximately 75° C. above the annealing temperature. Furthermore, it has been found that a glass composition containing either of these nucleating agents upon crystallization has a higher coefficient of thermal expansion and a higher annealing temperature than in the uncrystallized state. Therefore, when a glass composition containing either of these compounds is subjected to dielectric heating sufficient to maintain the entire specimen at a temperature above the annealing point and the interior portions at a temperature above that which causes appreciable crystallization, upon rapid cooling, an improved ceramic product which has greater resistance to external forces than would be expected for uncrystallized glass is produced.

While the foregoing has described a general and preferred embodiment of this invention, it is to be understood that changes in the glass composition and heating methods resorted to may be made without departing from the spirit and scope of the invention as claimed.

What is claimed as new is as follows:

1. The method of producing a ceramic product with a surface under high compressional stress which includes heating a glass composition containing a nucleating agent by creating dielectric losses within it thereby heating the glass interally to create a temperature sufficient to cause the devitrification of an increase in the annealing point and coefficient of expansion of the interior of said product and cooling its surface to maintain the surface below approximately the annealing temperature of the glass composition while it is being so heated.

2. The method of producing a ceramic product with a surface under high compressional stress which includes supporting a glass composition containing a nucleating agent between electrodes, creating an electromagnetic field between the electrodes to cause a heating of the composition by the dielectric losses produced in it thereby heating the glass internally to create a temperature sufficient to cause the devitrification of an increase in the annealing point and coefficient of expansion of the interior of said product and cooling its surface to maintain the surface below approximately the annealing temperature of the glass composition while it is being so heated.

3. The method of producing a ceramic product with a surface under high compressional stress which includes heating the interior of a glass composition containing a nucleating agent to a temperature sufficient to cause the devitrification of and increase in the annealing point and coefficient of expansion of the interior while at the same time maintaining the exterior of the composition at a temperature low enough to prevent devitrification.

4. The method claimed in claim 3 wherein the nucleating agent contained in the glass composition is one from a group comprising zirconium oxide and titanium dioxide.

5. The method of producing a ceramic product with a surface under high compressional stress which includes heating the interior of a glass composition containing a nucleating agent to about 75° C. higher than the annealing point of the exterior and to a temperature sufficient to cause the devitrification of the interior and maintaining the exterior at a temperature low enough to prevent devitrification while it is so heated.

6. The product produced by the method of claim 1.

References Cited by the Examiner

UNITED STATES PATENTS

| | | |
|---|---|---|
| 2,294,413 | 9/1942 | Marshall. |
| 2,998,675 | 9/1961 | Olcott et al. _____ 65—33 |
| 3,063,198 | 11/1962 | Babcock _____ 65—33 X |

DONALL H. SYLVESTER, *Primary Examiner.*